US010243315B2

United States Patent
Liew et al.

(10) Patent No.: US 10,243,315 B2
(45) Date of Patent: Mar. 26, 2019

(54) SOLID-STATE OPTICAL AMPLIFIER CHIP WITH IMPROVED OPTICAL PUMPING

(71) Applicant: DICON FIBEROPTICS, INC., Richmond, CA (US)

(72) Inventors: Seng Fatt Liew, Berkeley, CA (US); Ho-Shang Lee, El Sobrante, CA (US)

(73) Assignee: DICON FIBEROPTICS, INC., Richmond, CA (US)

( * ) Notice: Subject to any disclaimer, the term of this patent is extended or adjusted under 35 U.S.C. 154(b) by 0 days.

(21) Appl. No.: 15/716,827

(22) Filed: Sep. 27, 2017

(65) Prior Publication Data

US 2019/0020169 A1     Jan. 17, 2019

Related U.S. Application Data

(60) Provisional application No. 62/532,255, filed on Jul. 13, 2017.

(51) Int. Cl.
| | |
|---|---|
| *H01S 3/00* | (2006.01) |
| *H01S 3/063* | (2006.01) |
| *G02B 6/12* | (2006.01) |
| *H01S 3/0941* | (2006.01) |
| *G02B 6/138* | (2006.01) |
| *H01S 3/067* | (2006.01) |
| *H01S 3/094* | (2006.01) |

(52) U.S. Cl.
CPC ........ *H01S 3/0637* (2013.01); *G02B 6/12004* (2013.01); *G02B 6/138* (2013.01); *H01S 3/06783* (2013.01); *H01S 3/0941* (2013.01); *H01S 3/0675* (2013.01); *H01S 3/094061* (2013.01)

(58) Field of Classification Search
CPC ............... H01S 3/094007; H01S 3/094049
USPC .......................................... 359/342
See application file for complete search history.

(56) References Cited

U.S. PATENT DOCUMENTS

| | | | |
|---|---|---|---|
| 5,365,538 A | * | 11/1994 | Tumminelli ......... H01S 3/0632 372/66 |
| 6,721,087 B2 | | 4/2004 | Alduino et al. |
| 7,088,890 B2 | | 8/2006 | Liu |
| 7,130,111 B2 | | 10/2006 | Alduino et al. |

(Continued)

FOREIGN PATENT DOCUMENTS

WO    WO2008117249 A1    10/2008

OTHER PUBLICATIONS

U.S. Appl. No. 15/702,064, filed Sep. 12, 2017 by Lee.

(Continued)

*Primary Examiner* — Mark Hellner
(74) *Attorney, Agent, or Firm* — Vierra Magen Marcus LLP

(57) ABSTRACT

A solid-state optical amplifier chip is described, with improved pumping, in which pump light from one or more solid-state light sources is coupled efficiently into the doped areas of the chip, resulting in amplification of an optical signal. The optical signal is carried in the core of an optical waveguide. Rare-earth elements are used as dopants, primarily in the cladding of the optical signal's waveguide core, in order to provide amplification of the optical signal through stimulated emission. A variety of waveguide structures are described for routing and distributing the pump light to the doped areas of the chip.

43 Claims, 14 Drawing Sheets

(56) References Cited

U.S. PATENT DOCUMENTS

| | | |
|---|---|---|
| 8,447,152 B2 | 5/2013 | Lee et al. |
| 8,619,358 B2 | 12/2013 | Kimerling et al. |
| 9,742,144 B1* | 8/2017 | Kang .................. H01S 3/1603 |
| 2002/0191916 A1 | 12/2002 | Frish et al. |
| 2009/0231682 A1 | 9/2009 | Kashyap et al. |
| 2012/0051686 A1 | 3/2012 | Pitwon |
| 2012/0320451 A1* | 12/2012 | Muendel .......... H01S 3/094007 |
| | | 359/341.31 |

OTHER PUBLICATIONS

Morichetti, Francesco, et al., "Box-Shaped Dielectric Waveguides: A New Concept in Integrated Optics?" Journal of Lightwave Technology, vol. 25, No. 9, Sep. 2007, 11 pages.
Fukuda et al., "Silicon Photonic Circuit with Polarization Diversity," Optics Express 16(7); 4872-4880, Mar. 26, 2008.
Polman et al., "Broadband Sensitizers for Erbium-Doped Planar Optical Amplifiers: Review," Journal of the Optical Society of America B 21(5): 871-892, May 2004.
Shin et al., "Arrayed Waveguide Collimator for Integrating Free-Space Optics on Polymer Waveguide Devices," Optics Express 22(20):23801-23806, Oct. 6, 2014.
Yoshimoto et al., "Highly Efficient Coupling Semiconductor Spot-Size Converter with an InP/InAlAs Multiple-Quantum-Well Core," Applied Optics 34(6):1007-1014, Feb. 20, 1995.
U.S. Appl. No. 15/344,730, filed Nov. 7, 2016, by Lee.
Restriction Requirement dated Mar. 9, 2017, U.S. Appl. No. 15/344,730, filed Nov. 7, 2016, by Lee.
Response to Restriction Requirement dated May 9, 2017, U.S. Appl. No. 15/344,730, filed Nov. 7, 2016, by Lee.
Notice of Allowance dated Jun. 16, 2017, U.S. Appl. No. 15/344,730, filed Nov. 7, 2016, by Lee.

* cited by examiner

SOLID-STATE OPTICAL AMPLIFIER CHIP WITH IMPROVED OPTICAL PUMPING

PRIORITY CLAIM

This application claims the benefit of U.S. provisional pat. app. 62/532,255, filed Jul. 13, 2017, which is hereby incorporated in its entirety by this reference.

BACKGROUND

The following is related generally to the optical components used in optical communication networks, and specifically to optical devices that can amplify optical signals.

Erbium-Doped Fiber Amplifiers (EDFAs) or Praseodymium-Doped Fiber Amplifiers (PDFAs) are widely deployed in optical networks, in the 1550 nm or 1310 nm wavelength windows, respectively. FIG. 1 illustrates the multiple optical components that are commonly included in an EDFA or PDFA. The optical power from the pump laser light source 102 is combined with the input signal 101, by a wavelength-division multiplexing (WDM) coupler 104. The combined input signal and pump laser light then passes through a section of fiber 103 that has been doped with Erbium or Praseodymium ions in its core. The pump laser light excites the Erbium or Praseodymium ions embedded in the erbium-doped (or praseodymium-doped) fiber 103 to a higher energy level. The optical input signal 101 then induces stimulated emission and is therefore amplified to create the output signal. However, amplified spontaneous emission (ASE) noise is also generated simultaneously, and creates noise on top of the amplified input signal 101. Thus, the output signal 106 consists of an amplified input signal, as well as the ASE noise component. An isolator 105 is located after the erbium-doped or praseodymium-doped fiber 103. This isolator 105 is intended to prevent the back-scattering power out of the downstream optical fiber and other components from re-entering the EDFA or PDFA. This unwanted back scattering power would otherwise be amplified, and would therefore interfere with the EDFA's (or PDFA's) normal characteristics and performance. Also shown in FIG. 1 is a pump laser monitoring port 107.

In order to reduce the size and cost of an optical amplifier, it is desirable to replace the loop of doped fiber (item 103 in FIG. 1) with an optical waveguide structure. FIGS. 2A, 2B, and 2C show several types of optical waveguides that are commonly used for integrated light wave circuits. An optical waveguide consists of a core with higher refractive index than the cladding portions of the waveguide structure, in order to confine and guide light along the waveguide through total internal reflection. FIG. 2A shows a planar waveguide consisting of a core layer 201 surrounded by two cladding layers, a cover layer 202 and a substrate 203, which have lower refractive index than the core 201. The power of the optical wave is confined in the core layer in the z-direction and can propagate freely in the x-y plane. The thickness of the core layer can range from a few hundred nanometers to tens of micrometers, depending on the wavelength and desired number of optical modes. The electric field intensity of the fundamental guided mode 204 has a peak power at around the center of the core and its intensity is reduced at the two interfaces to the cladding layers. A portion of the electric field can penetrate into the cladding layers, which have lower refractive indices, this is known as the evanescent field of the guided mode. The penetration depth of the evanescent field into the claddings depends on the refractive index contrast between the core and the claddings, as well as the core thickness. Lower index contrast and a smaller core will result in larger penetration depth.

A buried channel waveguide can be used to confine light in two directions, and as shown in FIG. 2B, the light is confined in both the z-direction and the x-direction, and propagates in the y-direction. The core 207 is surrounded by the cover layer 205 and the substrate 206, which have lower refractive indices. Most of the power of the guided mode is confined inside the core 207, although some of the evanescent field 208 extends into the claddings 205 and 206. The propagation constants of the two polarization states, referred to as the transverse electric (TE) and transverse magnetic (TM) modes, are dependent on the core geometry and refractive index contrast. For optical amplifier applications, it is often desirable to have the same or similar propagation constant for both polarizations to reduce the dispersion effect and polarization dependent gain/loss.

As shown in FIG. 2C, confinement in the x-direction can also be achieved by fabricating a rib structure 209 on top of, or adjacent to, the core layer 213. This is called a rib waveguide and is usually fabricated by etching away some of the core material to form a protruding rib. The height and width of the rib determines the power confinement of the guided mode. A shallow rib will result in weak confinement and the electric field intensity of the guided mode 210 will be extended in the x-direction. The rib structure 209 can also be fabricated from materials different than the core layer 213, with appropriately chosen refractive index.

FIG. 3A shows one example of a prior art embodiment of a waveguide-based optical amplifier, where the pump laser 301 and optical signal 302 are injected into the same core 305, surrounded by claddings 304. The waveguide structure would usually be implemented using a buried channel waveguide, or a rib waveguide, as shown in FIGS. 2B and 2C, respectively. The core 305 can be doped with rare-earth elements such as Erbium ions for signal amplification at around 1550 nm, or Praseodymium ions for signal amplification at around 1310 nm, for fiber optics communication applications. (In the discussion that follows, the use of Erbium ions will be assumed. One skilled in the art will recognize that other rare-earth ions can also be used, for signal wavelengths that are not in the vicinity of 1550 nm.) As the pump light propagates along the waveguide, it is being absorbed by the Erbium ions, which are excited to higher energy level(s). An excited Erbium ion can relax to the ground state through emission of a photon with wavelength longer than the pump light source, either through stimulated or spontaneous emission. The optical signal in the waveguide can stimulate the emission of a photon from an excited Erbium ion, with the same wavelength and properties (e.g. polarization, coherence) as the signal photons. Such stimulated emission is used to transfer energy from pump to signal, through the excitation and relaxation of the Erbium ions. As the optical signal propagates along the waveguide, it gains energy from the Erbium ions and its power increases. At the end of the waveguide, the signal 303 has been amplified, with gain on the order of a few dB, to tens of dB, while the pump intensity is greatly attenuated. However, the spontaneous emission can have different wavelength, polarization and coherence properties, compared to the optical signal. Therefore, the spontaneous emission represents an undesirable artifact of the optical amplifier. The spontaneous emission will be guided by the waveguide core 305, and will be amplified as well (306). This is called amplified spontaneous emission (ASE), and it is a dominant noise source that reduces the signal-to-noise ratio (SNR) of an optical amplifier. Furthermore, ASE also reduces the total amplifier gain since part of the pump energy is used to amplify the ASE noise instead of the input optical signal.

Instead of injecting the pump light at the same input port as the signal, it can also be injected from the output port, in which case the pump is propagating in the opposite direction as the signal. Bi-directional pumping has been adopted as well, to provide more uniform gain along the waveguide. FIG. 3B illustrates another waveguide amplifier which integrates laser diodes 353 as pump sources, coupled into a waveguide 351 which has been doped with rare-earth ions. The pump laser light from multiple laser diodes is injected into the waveguide 351 through evanescent coupling, instead of the physical "Y"-split junction that was shown in FIG. 3A.

SUMMARY

In one set of embodiments, an optical amplifier structure includes a substrate, an optical signal core, one or more claddings formed on the substrate, a secondary waveguide structure, and one or more injection ports. The optical signal core is formed on the substrate and provides an optical path from an optical signal input port to an optical signal output port. At least one of the claddings is doped with one or more dopant elements or materials that emit light within a first wavelength range when illuminated with pump light of a wavelength that is shorter than that of the first wavelength range. The optical signal core is located in or in proximity to the doped cladding, and the claddings have indices of refraction that are lower than an index of refraction of the optical signal core. The secondary waveguide structure is formed in or in proximity to the doped cladding and in proximity to the optical signal core, and is configured to confine pump light injected thereinto within the secondary waveguide structure. The one or more injection ports are configured for placement of a corresponding one or more pump light sources to inject pump light into to the secondary waveguide structure.

In another set of embodiments, an optical amplifier system includes one or more pump light sources and an optical amplifier chip. The optical amplifier chip includes a substrate, an optical signal core, one or more claddings formed on the substrate, a secondary waveguide structure, and one or more injection ports. The optical signal core is formed on the substrate and provides an optical path from an optical signal input port to an optical signal output port. The one or more claddings are formed on the substrate and at least one of the claddings is doped with one or more dopant elements or materials that emit light within a first wavelength range when illuminated with pump light of a wavelength that is shorter than that of the first wavelength range. The optical signal core is located in or in proximity to the doped cladding, and the claddings have indices of refraction that are lower than an index of refraction of the optical signal core. The secondary waveguide structure is formed in or in proximity to the doped cladding and in proximity to the optical signal core, and is configured to confine pump light injected thereinto within the secondary waveguide structure. The one or more injection ports are coupled to the one or more pump light sources to inject pump light into to the secondary waveguide structure.

Various aspects, advantages, features and embodiments are included in the following description of examples thereof, which description should be taken in conjunction with the accompanying drawings. All patents, patent applications, articles, other publications, documents and things referenced herein are hereby incorporated herein by this reference in their entirety for all purposes. To the extent of any inconsistency or conflict in the definition or use of terms between any of the incorporated publications, documents or things and the present application, those of the present application shall prevail.

DETAILED DESCRIPTION

The following presents optical pumping structures to efficiently couple the pumping energy to the signal. Pump energy is injected into an optical cavity, is trapped within, and then propagates inside the optical cavity, which contain a long loop of waveguide and its associated doped cladding within.

Figure 1:
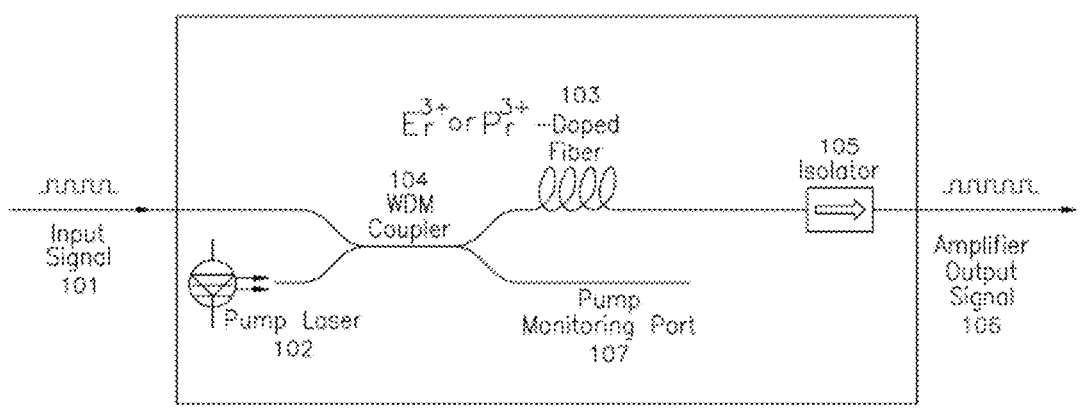
FIG. 1 illustrates a generalized optical amplifier, including a pump laser and a loop of rare-earth doped fiber.
Figure 2A:
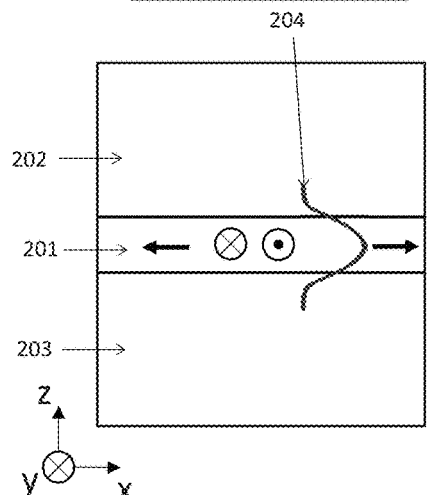
FIGS. 2A, 2B, and 2C show functional representations of several types of prior art waveguide structures.
Figure 2B:
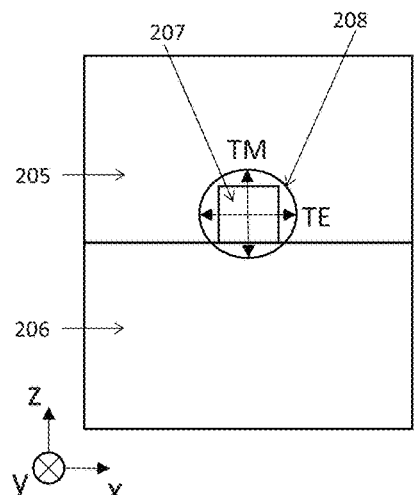
Figure 2C:
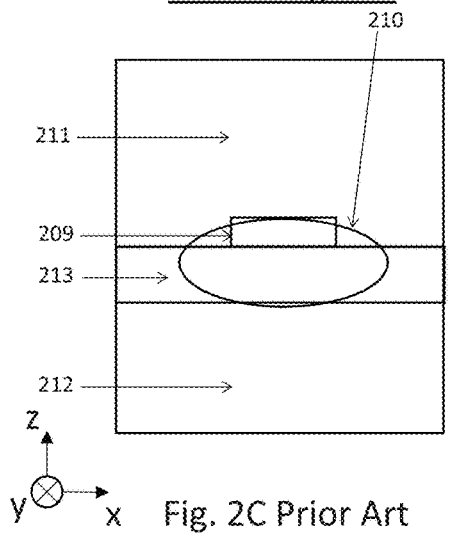
Figure 3A:
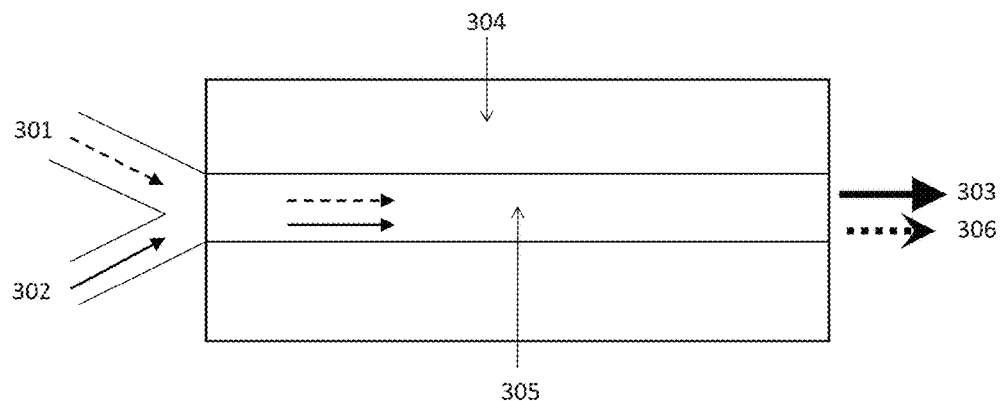
FIGS. 3A and 3B show functional representations of some examples of prior art waveguide-based optical amplifiers.
Figure 3B:
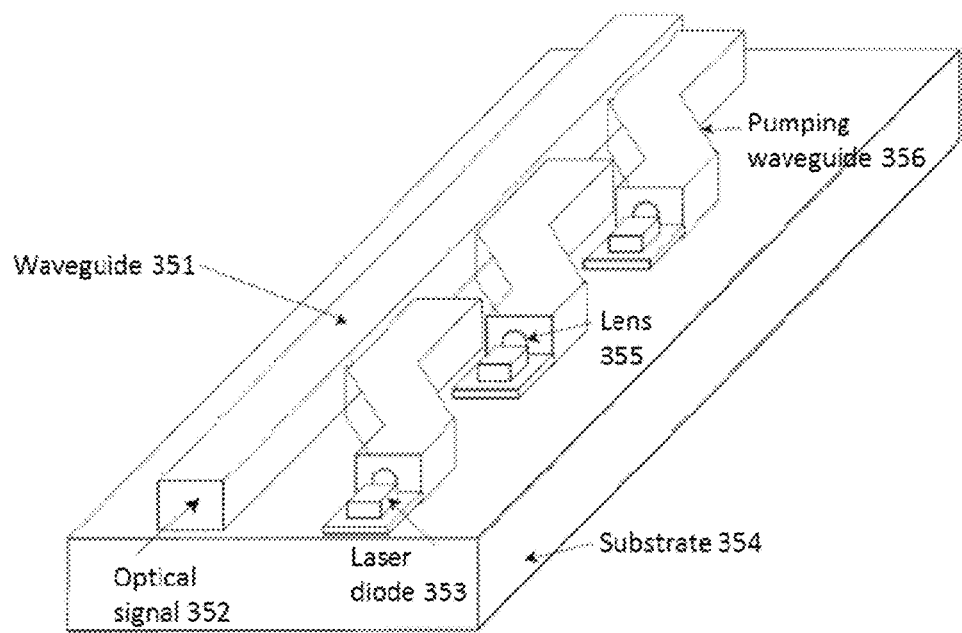
Figure 4:
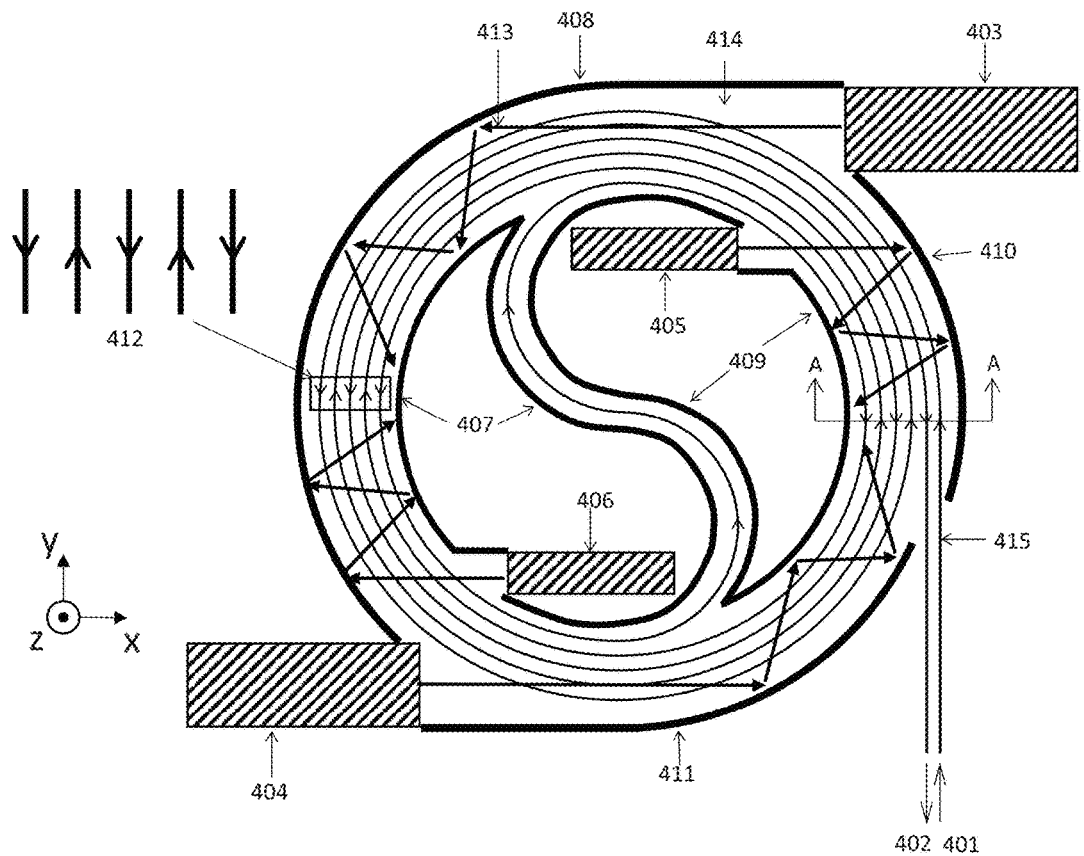
FIG. 4 shows a top view of an embodiment in which reflective surfaces are used to confine the pump light that is coupled into the cladding of a waveguide structure.

FIG. 4 shows a top view of an embodiment of an optical amplifier chip that has waveguide cores 412 for carrying the input optical signal, integrated solid-state pump light sources 403, 404, 405, and 406, and reflectors 407, 408, 409, 410, and 411 on the inner surface to trap the pump light. In the shown embodiment, the pump light sources 403 and 404 are attached to injection ports along the edge of the optical amplifier chip, while the pump light sources 405 and 406 are mounted in recesses on the surface of the optical amplifier chip for this purpose. The waveguide cores are embedded within cladding material 414 that has been doped with one or more rare-earth elements to provide optical gain for the amplification of input signal. (For more detail, see U.S. patent application Ser. No. 15/344,730, "Solid-State Optical Amplifier Having an Active Core and Doped Cladding in a Single Chip", Ho-Shang Lee, filed on Nov. 17, 2016.) Depending on the signal wavelength, rare-earth dopants such as Erbium, Praseodymium, Thulium, Ytterbium, Neodymium, or their combinations are used. The dopant material may also be quantum dots, dyes, metal, or some other material that can emit light at the appropriate signal wavelength range. Additional sensitizers such as various metals, chromophores or nano-crystals can also be included to enhance the excitation efficiency of the light emitters. Erbium is used as an example of the doped rare-earth element in the following description, without losing its generality and applicability to other rare-earth elements, or to other dopant materials. As shown in FIG. 4, the signal core 415 is looped into a spiral geometry to maximize the total waveguide length and amplifier gain while retaining a small device footprint. The total waveguide length may be as long as tens of centimeters, or even meters, coiled within a chip area that ranges from several mm$^2$ to a few cm$^2$. The input optical signal is coupled into the waveguide core at optical input port 401, propagates in counter-clockwise direction until it reaches the center of the spiral and then loops back and propagates in clockwise direction towards the optical output port 402. As a result, the optical signal propagates in opposite directions between adjacent cores, as seen in the enlarged inset drawing 412. The optical signal is being amplified as it propagates along the spiral waveguide core. The input and output ports can be interchanged, and it will not affect the amplifier performance. A mirror symmetry of the spiral shown in FIG. 4 (for example, rotating the spiral around either the x-axis or the y-axis) will work equally well.

The pump light that is required to excite the rare-earth ions in the doped cladding 414 is injected from one or more solid state light sources that can be placed at the center (405 and 406) and/or at the edges (403 and 404) of the chip's spiral waveguide structure. The pump light sources may be one of, or a combination of solid-state light sources such as light emitting diodes (LEDs), superluminescent light emitting diodes (SLEDs), or lasers such as semiconductor laser diodes (LDs). The following description will refer to laser diode (LD) embodiments for simplicity, but, the pump light sources can be viewed more generally as solid-state light emitters. A state of the art laser diode chip can emit high output power in the range of several hundred milliwatts to a few watts, with lateral dimensions that are on the order of several millimeters long, and a few hundred micrometers wide. With very high electrical to optical energy conversion (wall-plug) efficiency, it is a preferred pump source to be integrated into the amplifier chip to provide high pump intensity, while keeping the total chip footprint small. Pump light can be injected into the amplifier chip from the edge of the chip through butt-coupling.

After being injected into the doped cladding 414, pump light 413 is trapped inside a cavity which is formed by multiple reflectors 407, 408, 409, 410, and 411. These reflectors can either be metallic mirrors, epsilon-near-zero elements, photonic crystals, distributed Bragg reflectors, or any other optical elements that have high reflectivity at the pump wavelength. The reflectors 407, 408, 409, 410, and 411 are arranged to form a ring-shaped cavity, so that the pump light can be bounced back and forth between the reflectors as it circulates inside the cavity. Other embodiments can use cavities with other shapes that can trap the pump light. The pump intensity will decay as it is being absorbed by the Erbium ions that are distributed in the cladding. In this cavity embodiment, any unabsorbed pump light can keep circulating inside the cavity, leading to buildup of pump light intensity. The pump light may therefore be incident onto a rare-earth ion multiple times, effectively increasing the excitation efficiency. The injection ports for the pump light are preferably positioned away from the signal input and output ports 401 and 402, to reduce cross-coupling of pump light from the cavity into the input and output waveguides/fibers.

Figure 5A:
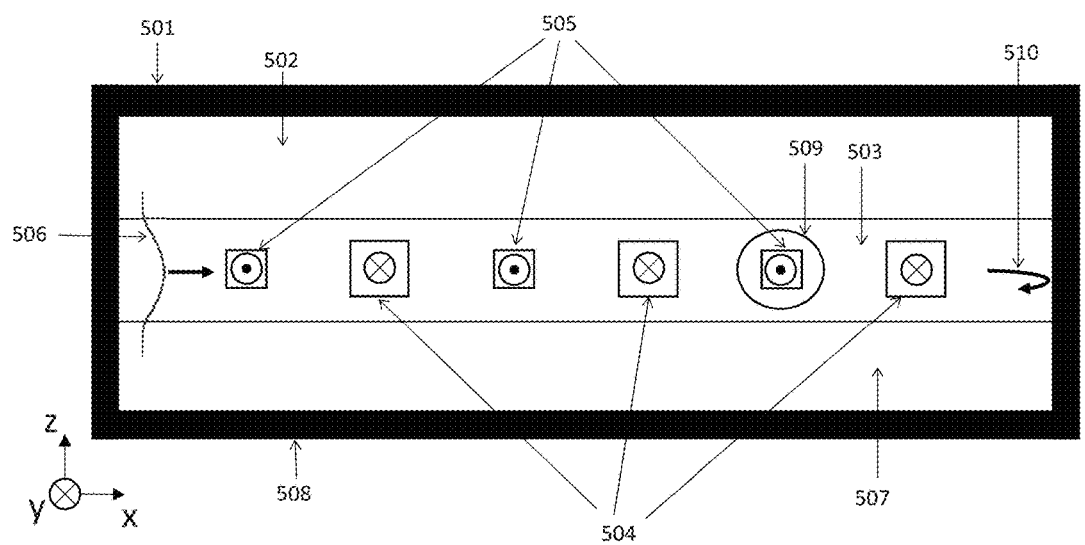
FIGS. 5A and 5B show cross-section views of the embodiment shown in FIG. 4, with the signal-carrying waveguide cores being embedded into a doped cladding layer.

FIG. 5A shows a cross-section view of the embodiment of FIG. 4, taken at the A-A "cut-line" of FIG. 4. Additional reflectors (501 and 508) can be placed at the top and bottom of the amplifier chip to trap the pump light in the vertical z-direction as well. The cross-section of the optical signal cores are indicated as 504 and 505 in FIG. 5. They are at least partially embedded inside an Erbium doped layer 503, which has lower refractive index than the cores, and acts as a cladding layer for the waveguide cores. The host material for the doped layer 503 can be oxides, polymers, organic materials, nano-crystals, poly-crystalline thin film, or crystalline thin film, with refractive index in the range of 1.4 to 3, depending on the refractive index of the cores. For example, Erbium doped host materials such as amorphous aluminum oxide, crystalline potassium double tungstate, poly-crystalline silicates, or $NaYF_4$ nano-crystals in polymers are all viable options. The Erbium doped cladding layer thickness can range from few hundreds of nanometers to a few micrometers, depending on the core size and the guided mode's evanescent field distribution in the cladding (as represented by item 509). The optical signal in adjacent cores will propagate in opposite directions, for example, the optical signal propagates in the positive y-direction in cores 504 and its propagation direction is reversed in cores 505. The refractive index contrast between the cores (504 and 505) and the Erbium doped cladding (503) should be optimized to increase the evanescent field penetration depth into the cladding, while keeping the bending loss of the waveguide cores small. Undoped cover layer 502 and substrate 507, which have lower refractive indices than the doped cladding, are deposited on the top and bottom, respectively, of the Erbium doped cladding (503). In this embodiment, the doped layer 503 effectively acts as a planar waveguide for the pump light 506. The thickness of the cover layer and substrate can range from several micrometers to tens of micrometers. Additional cover or substrate layers can be added for mechanical stability, heat dissipation, or other purposes.

When pump light 506 is injected into the Erbium doped cladding, it will be confined in the doped layer in the z-direction by total internal reflection and propagates only in the x-y plane. The pump light will excite the Erbium ions in the cladding and its stimulated emission is used to amplify the optical signal through the evanescent field of the optical signal's guided mode 509, which is extended into the cladding. Unlike the typical waveguide amplifiers in the prior art, in the shown embodiment the core is undoped and only its surrounding cladding is doped with rare-earth ions. In this embodiment, the evanescent field of the signal guided mode induces stimulated emission from the Erbium ions and energy is coupled from the cladding into the core to provide gain for optical signal amplification. On the other hand, the spontaneous emission emitted in the doped cladding 503 is less likely to couple into the core compared to the stimulated emission, and this will significantly reduce the amplified spontaneous emission (ASE) noise at the signal output port. If the refractive index contrast between the core and cladding is reduced, the evanescent field penetrates deeper into the cladding and overlaps with more Erbium ions. The larger the spatial overlap, the higher is the signal gain as more Erbium ions can contribute to the signal amplification. The rare-earth ions doping level can be spatially uniform across the entire cladding 503 or it can have higher concentration closer to the cores and lower elsewhere. The spatial distribution of the rare-earth ions doping level in the doped layer 503 can be tailored by ions implantation, selective deposition or other methods to maximize the stimulated emission and minimize the spontaneous emission of the Erbium ions. After propagating across all the cores, the pump light 510 will be reflected back by one of the reflectors 407, 408, 409, 410, or 411 which form the cavity boundary. As a result, the pump light can pass through the doped layer 503 multiple times and will eventually be absorbed by the Erbium ions.

Figure 5B:
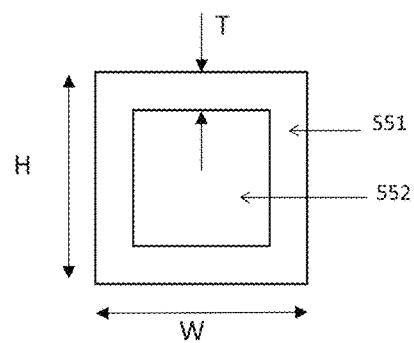

One design for the optical signal cores 504 and 505 is a box-shaped waveguide, as shown in FIG. 5B. (For more detail on structures of this type, see "Box-Shape Dielectric Waveguides: A New Concept in Integrated Optics?", Journal of Lightwave Technology, vol. 25, 2579 (2007).) The box-shaped waveguide consists of a high refractive index shell 551, enclosing a somewhat lower refractive index material at the center 552. Materials for the high refractive index shell 551 can be silicon, silicon nitride, oxides such as tantalum pentoxide, or other materials which are transparent at the signal wavelength range, and have refractive index in the range of 1.5 to 3.5. The lower-index material 552 can be oxides such as silicon dioxide, aluminum oxides, or other materials which have somewhat lower refractive index than the high index shell 551. The high-index shell 551 is undoped and the low-index center 552 can either be undoped or doped with rare-earth ions. The waveguide properties can be tuned by changing the height H, width W, and thickness of the high-index shell 551. For example, the propagation constants of the two polarization states TE and TM can be equalized and the polarization dependent gain/loss can be minimized or compensated, by tuning the aspect ratio H:W. In addition, the cores 504 may have different height H, width W and/or thickness T, compared to the cores 505, to prevent coupling or cross-talk of the optical signal between adjacent cores. The effective refractive index of the waveguide can also be changed by modifying the thickness of high-index shell 551. A large effective refractive index reduces bending losses, allowing a smaller bending radius for a more compact device footprint. However, the evanescent field of the guided mode will penetrate less into the cladding, which reduces the overlap with the Erbium ions and results in lower amplifier gain. As a result, the thickness T can be optimized to trade-off the device footprint for large optical signal gain or vice versa. The geometry of the waveguide is not limited to square or circular cross-sections. Other geometries with either four-fold symmetry (symmetric after 90 degrees rotation), or even two-fold symmetry (symmetric after 180 degrees rotation), with high-index shell and low-index core can be used in other embodiments. A solid core where 551 and 552 are made of same materials may be used as well, as long as the propagation loss for the optical signal is small. However, the box-shaped waveguide with high-index shell is preferred because of its low propagation loss, compared to a solid core waveguide.

Figure 6:
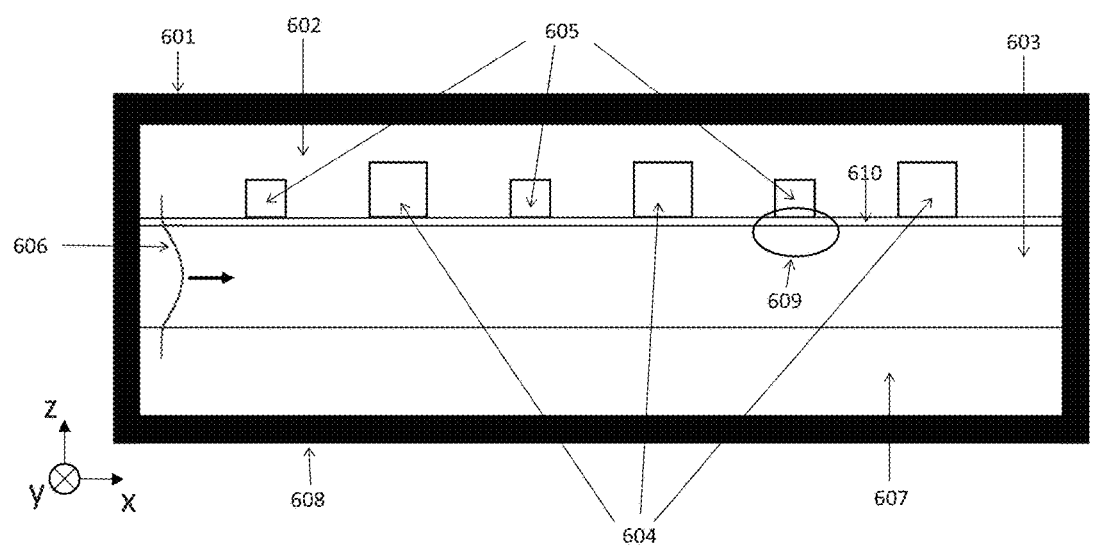
FIG. 6 shows a cross-section view of an embodiment in which the signal-carrying waveguide cores are located on top of the doped cladding layer.

Referring to FIG. 5A, when pump light 506 is incident on the cores 504 and 505, some of the pump light will be scattered out of the doped layer 503, into the cover layer 502 and substrate 507. In addition to absorption by the Erbium ions, scattering by the cores introduces additional loss to the pump intensity as it propagates inside the doped layer. To mitigate this scattering loss, FIG. 6 illustrates another embodiment where the signal cores 604 and 605 are placed outside of the Erbium doped layer 603. The cores 604 and 605 are adjacent to the surface of the doped layer, being in proximity by either being in direct contact with the surface of the doped layer 603, or with a separation by a small buffer layer 610, with thickness ranging from several nanometers to a few hundred nanometers, between the bottom of the cores and the Erbium doped layer. Some embodiments can include the buffer layer 610 to alter the evanescent field penetration depth into the doped layer, to further reduce scattering loss, or to reduce the film stress between the materials used for the cores and the Erbium doped layer. A cover layer 602 is deposited on top of the doped layer and encloses the cores. This cover layer may also be doped with rare-earth ions to further increase the optical signal gain. An undoped layer 607 is used as a substrate for the amplifier chip. Both the cover layer 602 and substrate 607 have a lower refractive index than the doped layer 603. Therefore, the doped layer 603 acts as a planar waveguide for confining the injected pump light 606 in the z-direction, by total internal reflection. For example, layer 603 can be Erbium doped aluminum oxide, and the cover layer 602 and substrate 607 can be silicon dioxides. In this embodiment, the scattering of the pump light 606 by the cores is significantly reduced when it propagates in the doped layer, compared to when the cores are located inside the doped layer, as in FIG. 5A. The reduced pump light scattering enables the buildup of pump light intensity in the doped layer and the higher pump intensity in turns results in higher excitation efficiency of the rare-earth ions. The electric field intensity of the optical signal guided mode is concentrated at the interface between the core and the doped layer, where a significant portion of the evanescent field intensity 609 can be extended into the doped layer 603 such that it overlaps with the Erbium ions there. Stimulated emission from the overlapped Erbium ions will amplify the optical signal that propagates inside the core. Without loss of generality, the cores 604 and 605 can also be placed inside the substrate layer and in this case, the substrate can either remain undoped, or it may be doped with rare-earth ions to provide gain for optical signal amplification.

Figure 7A:
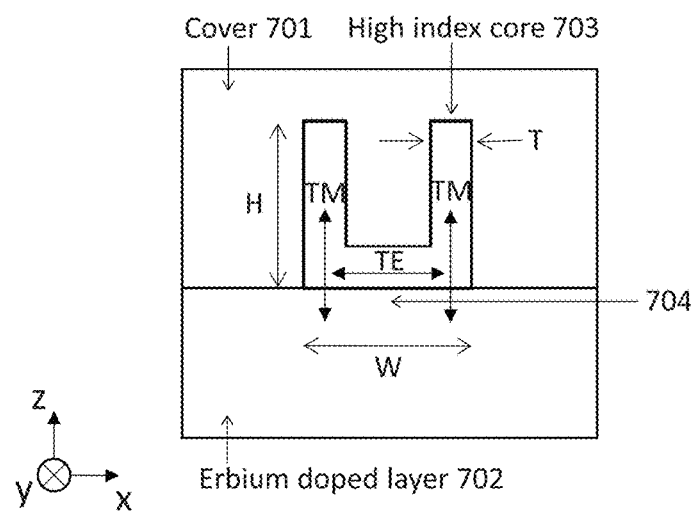
FIGS. 7A, 7B, 7C, and 7D show additional embodiments of signal-carrying waveguide cores, intended to minimize polarization-dependent gain.
Figure 7B:
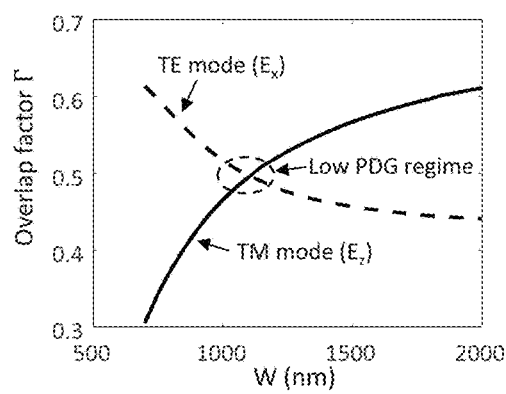
Figure 7C:
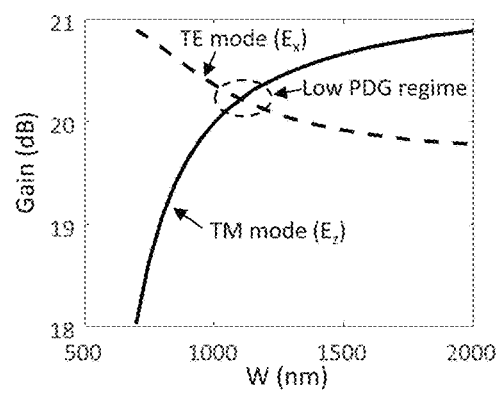

FIG. 7A shows another embodiment in which a "U-shape" waveguide is used as the optical signal core. This waveguide geometry maximizes the spatial overlap between the electric field of the guided mode with the Erbium doped layer, and at the same time, reduces the polarization dependent gain (PDG) experienced by the optical signal. In the "U-shape" waveguide, the electric field intensity of the guided mode will be localized at the interface 704 between the high index core 703 and the doped layer 702. The evanescent field of the signal's guided mode will be able to penetrate into the Erbium doped layer 702 beneath the high index core 703. Amplification of the optical signal is provided by the stimulated emission from the Erbium ions that overlap spatially with the evanescent field of the guided mode. When the refractive indices of the cover layer 701 and the Erbium doped layer 702 are different, an asymmetric geometry, such as the "U"-shape waveguide, can be a better option to balance the effective refractive indices or propagation constants for the TE and TM modes, thus achieving low birefringence and polarization independent gain. The polarizability for the TM mode (with electric field oscillating in the z-direction) is higher at the two arms of the "U"-shape waveguide. Similarly, the polarizability for the TE mode (with electric field oscillating in the x-direction) is higher at the bottom horizontal section of the "U"-shape waveguide. Therefore, when height H increases, the effective refractive index of the TM mode increases, and when width W increases, the effective refractive index for the TE mode increases. The change in effective refractive index is accompanied by a change in the spatial overlap between the evanescent field of the guided mode with the Erbium doped layer, which will affect the eventual signal gain. As a result, low polarization dependent gain and/or low birefringence can be achieved by optimizing the height H, width W and also thickness T. FIG. 7B shows the calculated overlap factor between the evanescent field and the doped layer for the two polarization states, at different values for the "U-shaped" waveguide's width W. In this example, the core 703 is made of silicon nitride (n=1.99), the doped layer 702 is aluminum oxide (n=1.65), and the cover layer 701 consists of silicon dioxide (n=1.45). The waveguide's height H is set at one micrometer, and the thickness T is set at 240 nanometers. As the width W increases, the overlap factor for the TE mode reduces, but it increases for the TM mode. At about 1100 nm, the overlap factor becomes the same for both. Since the overlap factor determines the optical gain, FIG. 7C shows that the gain becomes equal for both polarizations when W is approximately 1100 nm.

This exemplary calculation shows that by tuning the width W at a fixed height H, polarization independent gain can be achieved. The effective refractive index or propagation constant of the guided modes can also be modified through the high index core thickness T. A thicker core will result in higher effective refractive index for the guided mode, and will also allow smaller bending radius for the core, which reduces the overall amplifier chip footprint. Depending on the material chosen for the high index core, the thickness can range from tens of nanometers to hundreds of nanometers. The high index core material can be silicon nitride, silicon, or other materials which are transparent at the signal wavelength and have a refractive index that is between 1.5 and 3.5. The core width W and height H can range from sub-micrometer to a few micrometers.

Figure 7D:
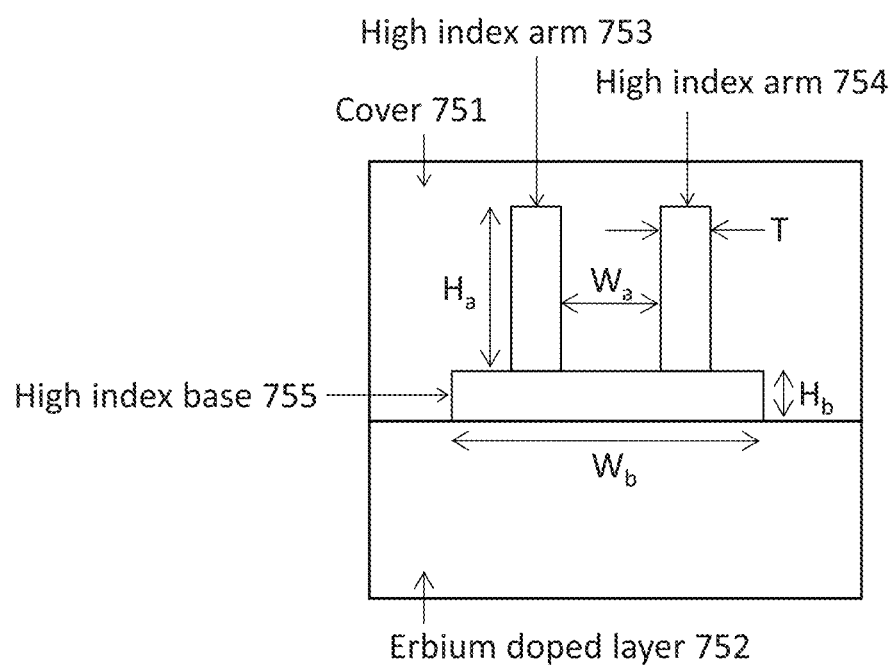

Other core shapes, such as an inverted "Π" or "T", are also applicable as signal cores, as long as the TE and TM modes have equal or similar propagation constants. FIG. 7D illustrates an inverted "π-shape" signal core embodiment, which consists of two arms 753 and 754, and a base 755, all fabricated from materials with high refractive indices. The arms and base can be made from different materials, and their respective dimensions can be adjusted independently to balance the propagation constants of the different polarization states. The height $H_b$ of the base 755 can range from tens of nanometers to a few hundred nanometers. The distance between the two high index arms 753 and 754, $W_a$, can be changed as well, where $W_a$ can range from zero (resulting in an inverted "T-shape") to a few micrometers. $W_a$ can be smaller or larger than the width of the high index base 755 $W_b$. If needed or desired, more than two high index arms can be incorporated on top of the base 755, and the height of the multiple arms can be the same or different.

Other embodiment makes use of pump waveguides in the Erbium doped layer, which are designed to primarily confine and guide the pump light at their wavelength, which is shorter than the wavelength of the input optical signal. This is different from conventional Erbium doped waveguide amplifiers (EDWAs), which have a single waveguide that is used to confine and guide both the pump light and the optical signal. As a result, in conventional EDWAs with a single waveguide, spontaneous emission at around the signal wavelength will be amplified as it propagates along the waveguide. This is called amplified spontaneous emission (ASE), and represents a dominant noise source that reduces the signal-to-noise ratio (SNR) of the system. Furthermore, ASE also reduces the total amplifier gain, since part of the pump energy is used to amplify the ASE noise instead of the input optical signal. In contrast, in an embodiment in which the pump light waveguide and the signal waveguide are separated, the pump waveguide is designed to guide the pump light, with a wavelength that is shorter than the signal wavelength. Optical confinement for the spontaneous emission will be very weak in the pump waveguide, such that its propagation loss and bending loss are larger than the pump light. As a result, the spontaneous emission is hardly guided by the pump waveguide, which prevents its amplification, and the ASE noise is reduced.

Figure 8A:
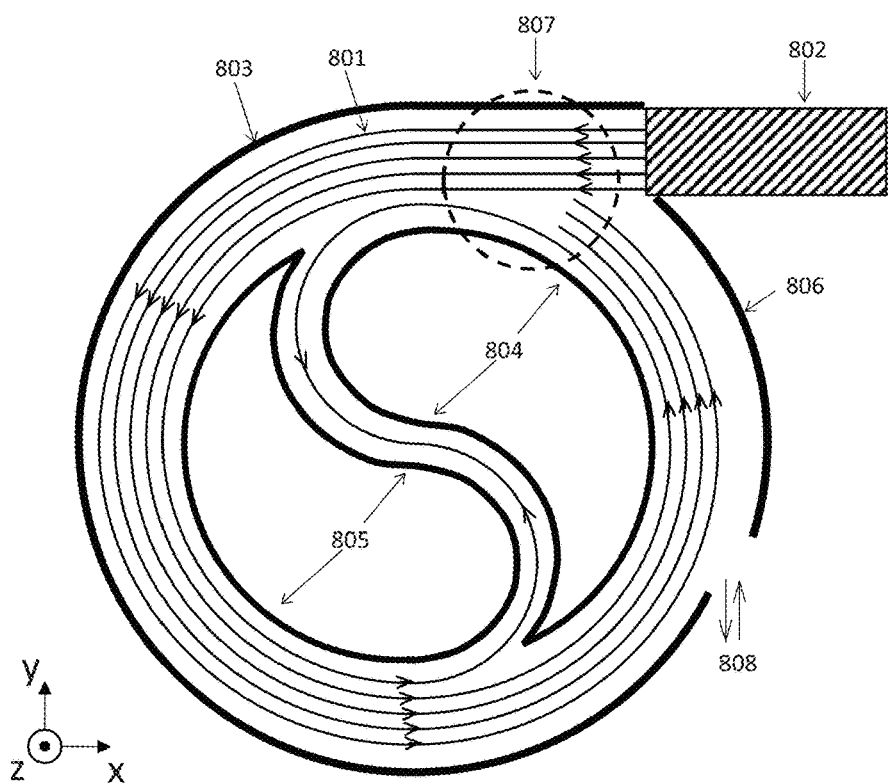
FIGS. 8A and 8B show top views of embodiments in which waveguide structures are used to route and distribute the pump light.

FIG. 8A shows one such embodiment where the pump waveguides 801 are coiled in a spiral geometry that basically follows the layout of the signal cores, except at region 807 where the pump waveguides are terminated, and thus do not form a closed loop as in the signal waveguide shown in FIG. 4. All or some of the pump waveguides 801 are connected to a light source 802, which can be a laser diode (LD), superluminescent light emitting diode (SLED), light emitting diode (LED), or another solid-state light source. The pump waveguides can be tapered down at the edge of the chip to increase the coupling efficiency of the pump into the Erbium doped layer. If more pump power is needed, more than one light source can be integrated either at the edge or at the center of the chip. The pump injection port is located away from the optical signal waveguide input/output port 808, to avoid cross-coupling of the pump light into the signal core. The pump waveguides are surrounded by reflectors 803, 804, 805, and 806, which combine to form a cavity to trap the residual pump light that escapes from the pump waveguides, especially at the ends of the pump waveguides, (region 807).

Figure 8B:
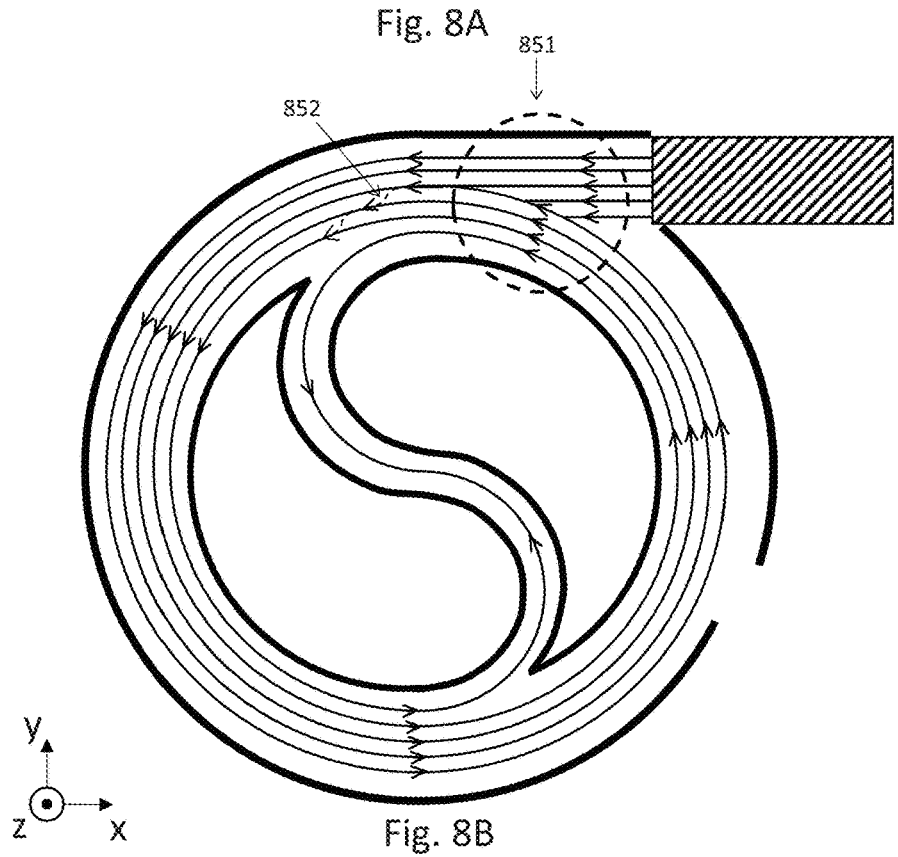

Depending on the pump light propagation loss and Erbium ion absorption, the pump intensity may not decay to zero after propagating in one loop. Therefore, the embodiment shown in FIG. 8B is designed to keep the pump light circulating in a closed-loop. In this embodiment, one or more pump waveguides will be connected from the light source to the closed-loop spiral indicated at 851. The pump waveguides can be designed to allow evanescent coupling between adjacent waveguides, which facilitates the spread of pump light 852 across different pump waveguides and creates a more uniform pump intensity distribution across all loops, and around the circumference of each loop.

Figure 9A:
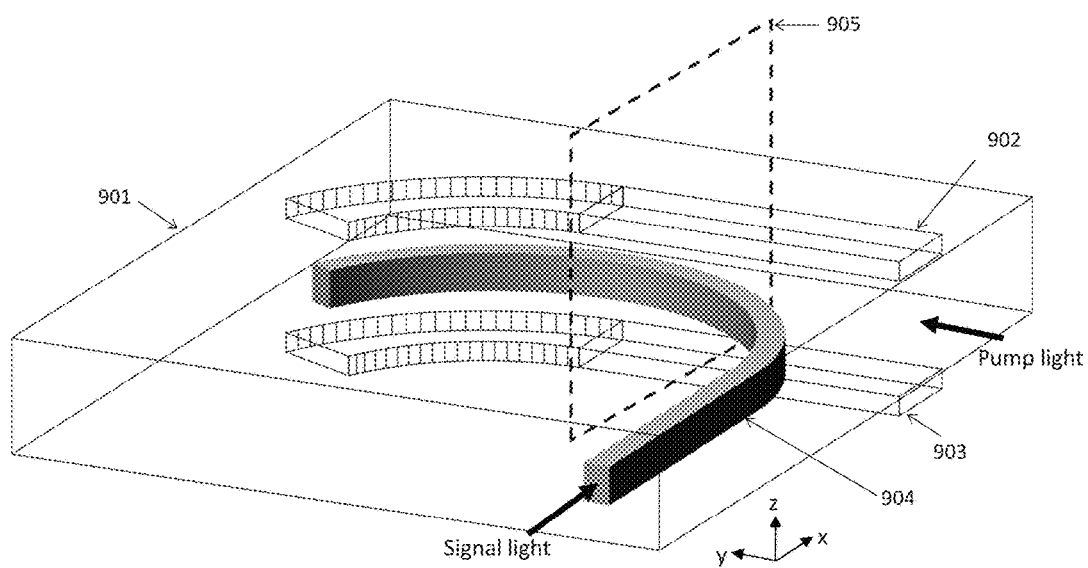
FIGS. 9A, 9B, and 9C show additional details of the embodiments shown in FIGS. 8A and 8B.

A three-dimensional view for one of the pump waveguide embodiments of FIG. 8A or 8B, is shown in FIG. 9A. FIG. 9A only shows part of the amplifier chip, but shows additional details of the pump waveguides and their relationship to the signal core. The core 904 that carries the optical signal is at least partially embedded inside an Erbium doped layer 901. Additional ridge/rib structures 902 and 903 are fabricated at the surfaces of the doped layer 901 to define a secondary pump waveguide in proximity to the core 904. For example, the rib structures 902 and 903 can be fabricated by using lithography and selective etching of the Erbium doped layer. Alternatively, other materials with a refractive index that is the same as or higher than the doped layer 901 can also be used to form the ribs 902 and 903. The injection port for the pump light and optical signal are positioned at different locations of the chip, to prevent cross-coupling of the pump light into the core 904, and also to reduce the out-coupling of the pump light from the amplifier chip.

Figure 9B:
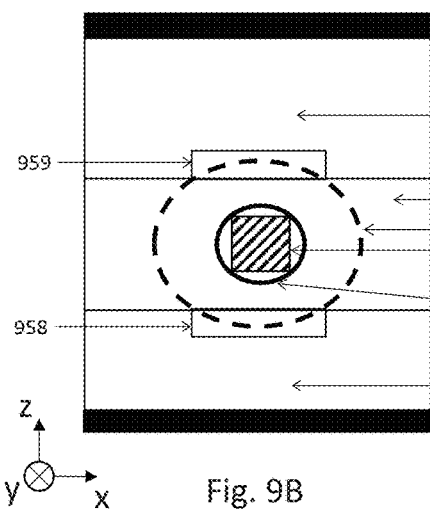

FIG. 9B shows a cross-sectional view of the pump waveguide design, with signal core at least partially embedded inside a doped layer 952, taken at the cross-section cut 905 in FIG. 9A. The overall cross-section of the chip is similar to the one shown in FIG. 5A except that two ridges or ribs (958 and 959) are added at the top and bottom surfaces of the doped layer 952 to define a pump waveguide, which encloses the signal core 954. In addition to the simple rib structure, a more complicated geometry may be used to optimize the guiding of the pump light and the overlap between the pump light's electric field and the Erbium doped layer. The pump waveguide is designed to mainly guide and confine the pump light, which has a shorter wavelength than the optical signal. Therefore, the pump will propagate in the double rib pump waveguide with its electric field intensity confined within the region 953, while the optical signal will be guided by the core 954. The pump will excite the Erbium ions located around the core which overlap with the evanescent field of the optical signal 960. Stimulated emission from the Erbium ions will couple back into the core 954 and increases the optical signal power.

Figure 9C:
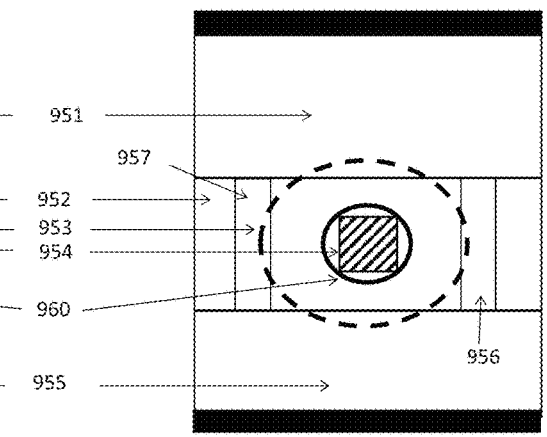

FIG. 9C shows a further embodiment using another method to fabricate the pump waveguide. Materials with refractive index lower than the doped layer 952 are used as claddings 956 and 957, thereby defining a pump waveguide which confines the pump light to a region that is close to the signal core. The pump waveguide design can also be a combination of the embodiments shown in FIGS. 9B and 9C.

Figure 10A:
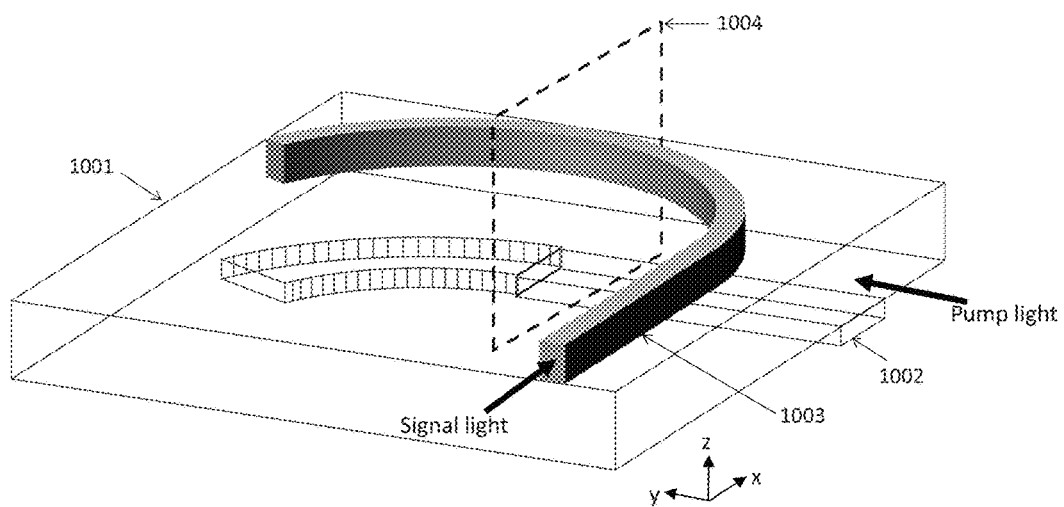
FIGS. 10A, 10B, and 10C show additional details of an alternative embodiment shown in FIGS. 8A and 8B.
Figure 10B:
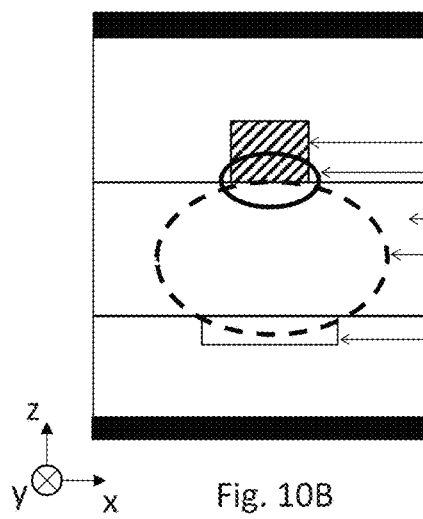
Figure 10C:
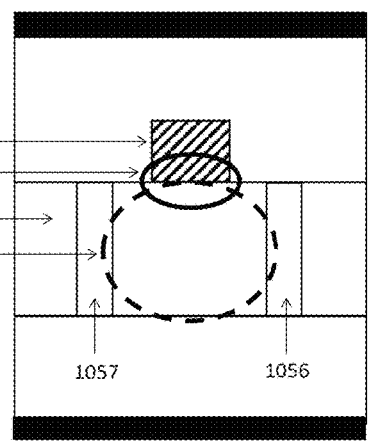

FIG. 10A shows another embodiment, in which the optical signal core is located outside of, but in proximity to, the Erbium doped layer to further reduce the pump light scattering loss induced by the cores. In this embodiment, the signal core 1003 is moved to the top surface of a doped layer 1001, and a ridge or rib structure 1002 is fabricated at the bottom of the doped layer. The ridge or rib defines a pump waveguide that is used to confine the pump light below the signal core. A cross-sectional view of the amplifier chip taken at cross-section cut 1004 is shown in FIG. 10B. Similar to the embodiment shown in FIG. 6, the signal core 1051 is located above an Erbium doped layer 1053 and the electric field of the guided mode 1052 is localized at the interface between the two. An additional rib structure 1055 is created at the bottom of the doped layer 1053, roughly aligned with the core. This rib structure can be fabricated by selective etching of the doped layer 1053 or it may be deposited using other materials with refractive index higher than or similar to the doped layer. Pump light, after being injected from the pump light source, will propagate along the waveguide with electric field intensity 1054 that is concentrated beneath the signal core. FIG. 10C shows another embodiment that uses another method to fabricate the pump waveguide, by embedding two claddings 1056 and 1057, with a refractive index that is lower than that of the doped layer 1053.

Figure 11:
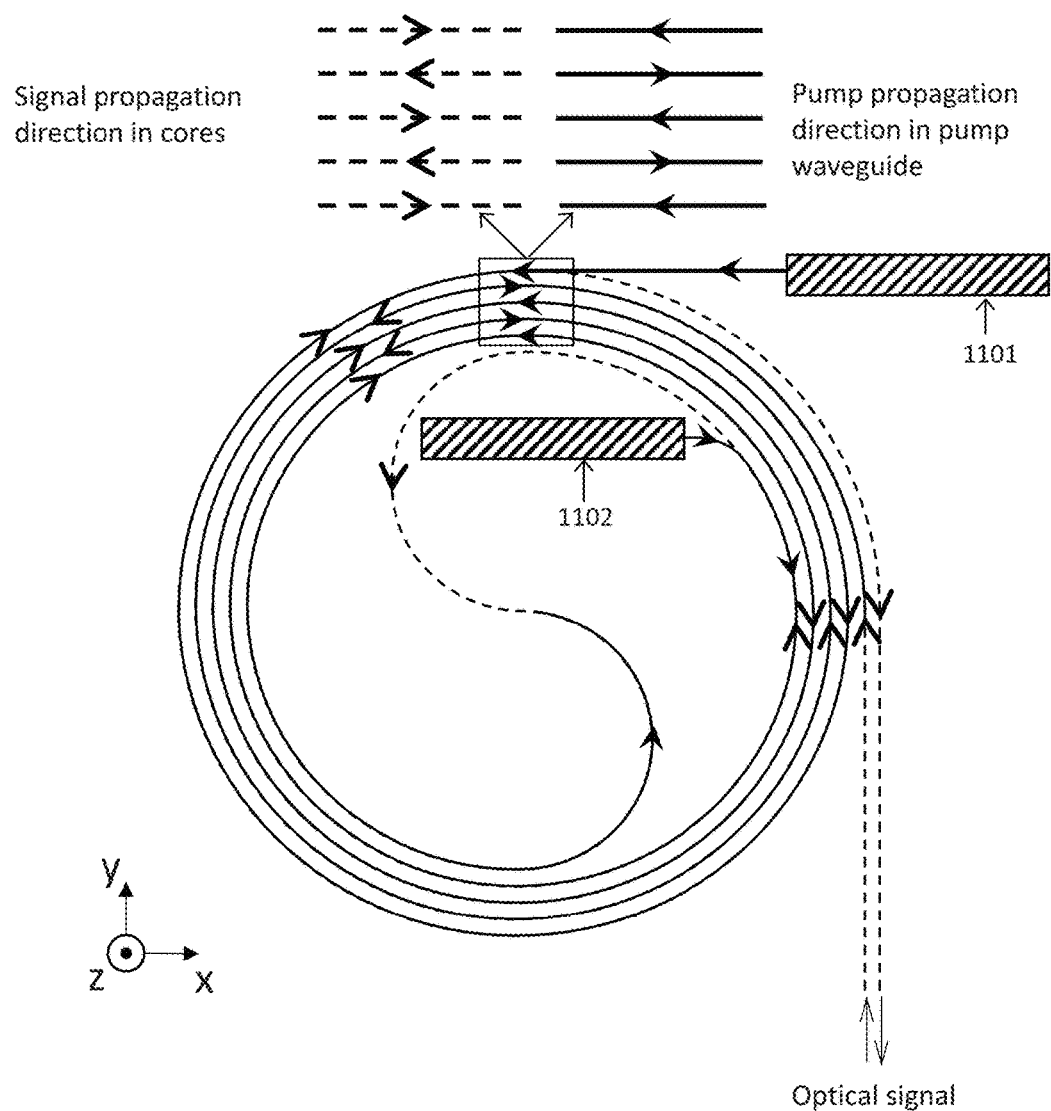
FIG. 11 shows the top view of an embodiment in which the pump light propagates in pump waveguides, but in a direction that is opposite to the propagation of the optical signal in its waveguide core.

FIG. 11 shows an additional embodiment where the pump light always propagates in the opposite direction of the input signal, inside the spiral waveguide structure. The counter-propagation of pump light and optical signal has the advantage of achieving higher amplifier gain, since the larger pump intensity close to the output port can provide gain to the signal which has already been significantly amplified. In addition, there will be a negligible amount of pump light at the actual signal output port, because the pump light propagates in the opposite direction with the signal. One or more pump light sources, for example single or multimode laser diodes, can be integrated into the chip to provide the necessary pump intensity to excite the Erbium ions to higher energy level.

Figure 12A:
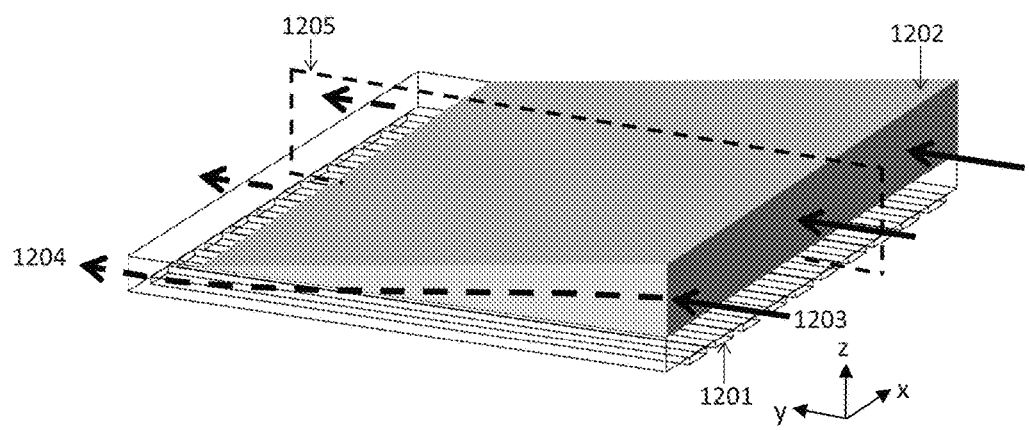
FIGS. 12A and 12B show a wedge-shaped structure with tapering height to couple pump light from a pump light source into the pump waveguides.
Figure 12B:
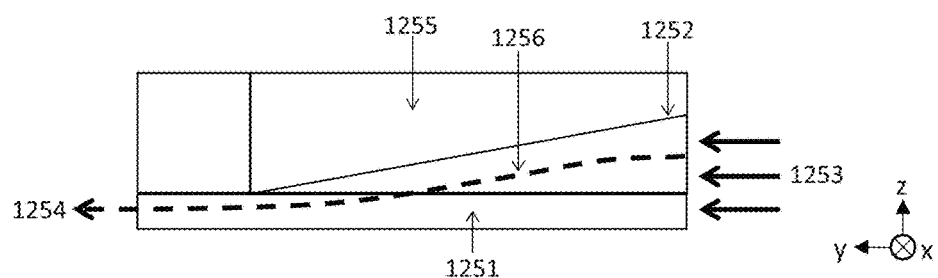

To increase the pump intensity and coupling efficiency, a wedge shape structure 1202, as shown in FIG. 12A, can be used to couple the laser diode emission 1203 into the pump waveguides 1201. The tapering of the height of the wedge in the z-direction helps to concentrate the pump power collected at the input facet into a thinner layer. As a result, the final pump intensity 1204 in the pump waveguides can be significantly enhanced compared to the input intensity of the original pump source emission 1203. FIG. 12B shows a y-z cross-sectional cut, as indicated by the dashed lines 1205 in FIG. 12A. The thicker part 1252 at the input facet facilitates the collection of laser diode emission, and the subsequent tapering enables the pump power to be focused into the pump waveguides, following the approximate light path indicated by dashed line 1256. Consequently, the pump intensity 1254 is increased. The taper length of the wedge structure in the y-direction can range from several micrometers to a few hundred micrometers. A longer taper length allows gradual transition of the guided modes from a thicker to a thinner layer and will reduce scattering losses. The thickest part of the wedge 1252 at the input facet could be few micrometers to tens of micrometers thick. The width of the wedge 1202 in the x-direction needs to be at least as large as the laser diode beam spot size, to collect most of the emission. The wedge 1202 should be made of materials that have similar or larger refractive index, compared to the underlying pump waveguides 1201. The materials can be semiconductors, polymers, ceramics, or other materials that can be fabricated into a wedge geometry. As long as the change is gradual, the tapering is not limited to a linear change in the height of the layer 1252. Alternate embodiments can use other shapes, such as a step-wise tapering, a parabolic tapering, or an exponential changing of the height. Additional cladding material 1255, which can be gels, polymers, semiconductors, or other materials with lower refractive index than the wedge 1252, can be deposited on top of the wedge.

Figure 13A:
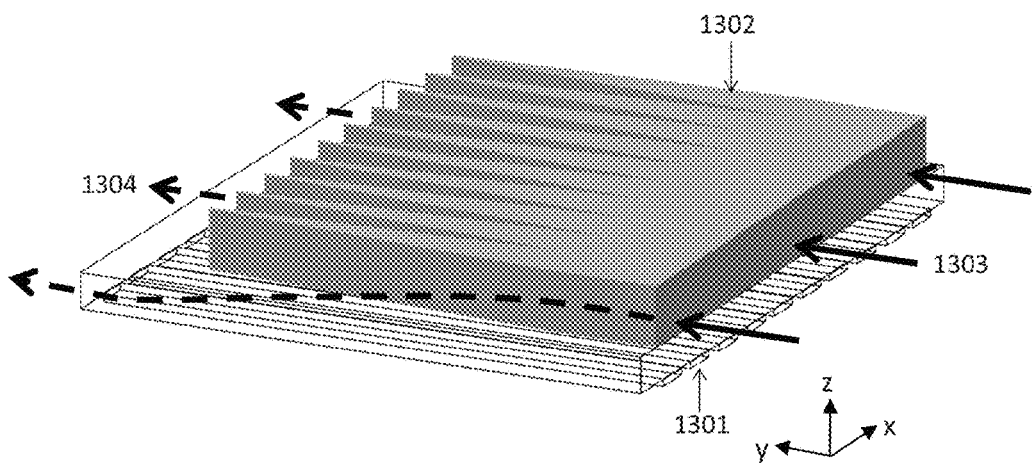
FIGS. 13A and 13B show a series of wedge-shaped structures with tapering width to couple pump light from a pump light source into the pump waveguides.
Figure 13B:
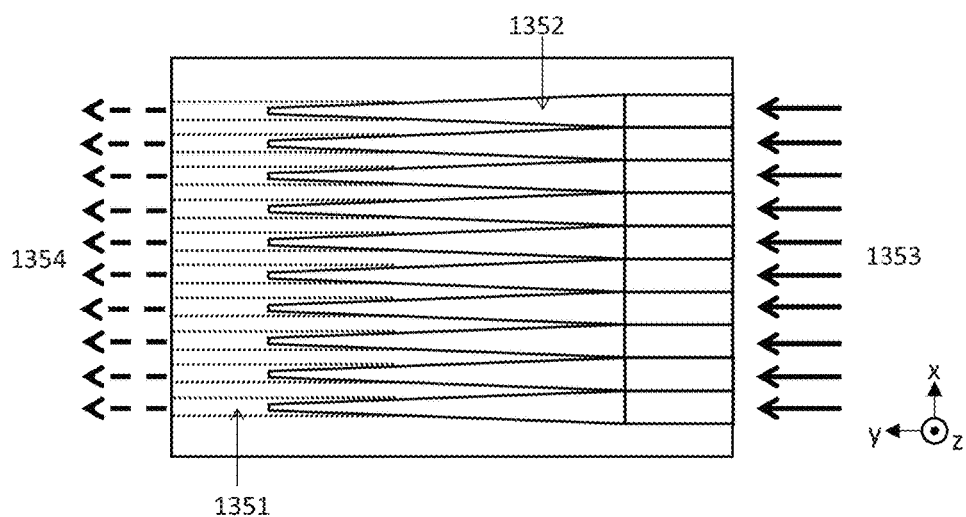

In addition to vertical tapering, a lateral tapering array 1302, as shown in FIG. 13A, provides another method for coupling the laser diode emission 1303 efficiently into the pump waveguide layer 1301, thereby increasing the final pump intensity 1304. The layer 1302 consists of an array of waveguides with gradually decreasing width, from the input facet where the pump laser light is coupled in. The tapering layer 1302 functions at first as a collector to capture as much laser diode emission as possible at the input facet. The subsequent tapering reduces the effective refractive index of layer 1302, and "squeezes" the pump laser energy into the pump waveguide layer 1301. As the pump light propagates in a thinner layer, the final pump intensity 1304 is increased. FIG. 13B shows a top-view (x-y plane) for the 3D structure illustrated in FIG. 13A. The laterally tapered waveguide array is indicated by 1352, and the dotted lines 1351 indicate the underlying pump waveguides. The number of tapered waveguides is not necessarily equal to the number of pump waveguides. The tapered waveguides 1352 should have refractive index similar to or greater than the pump waveguides 1351. The lateral tapering only requires a gradual transition of the waveguide width from wide to narrow. The width can change in a linear manner as shown in FIG. 13B but it can also take other shapes that allow a smooth transition of guided mode from a wide waveguide to a narrow one. The thickness of the tapered waveguide array in the z-direction can range from a few micrometers to tens of micrometers, and its length in the y-direction can range from tens of micrometers to hundreds of micrometers. In other embodiments, both of the vertical and lateral tapering described in FIGS. 12 and 13 can also be combined to make a single tapered-coupler.

Both the vertical tapering and lateral tapering structures shown in FIGS. 12 and 13 may also be applied to couple optical signals between fibers and the amplifier chip, at the input/output ports 401, 402 that are shown in FIG. 4. For such application, a narrower 1202 layer in the x-direction is required to confine the signal in the lateral direction.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit to the precise form disclosed. Many modifications and variations are possible in light of the above teaching. The described embodiments were chosen in order to best explain the principles of the proposed technology and its practical application, to thereby enable others skilled in the art to best utilize it in various embodiments and with various modifications as are suited to the particular use contemplated. It is intended that the scope be defined by the claims appended hereto.

It is claimed:

1. An optical amplifier structure, comprising:
   a substrate;
   an undoped optical signal core formed on the substrate providing an optical path from an optical signal input port to an optical signal output port;
   one or more claddings formed on the substrate, at least one of the claddings doped with one or more dopant elements or materials that emit light within a first wavelength range when illuminated with pump light of a wavelength that is shorter than that of the first wavelength range, the undoped optical signal core located in or in proximity to the doped cladding, and the claddings having indices of refraction that are lower than an index of refraction of the undoped optical signal core;
   a secondary waveguide structure formed in or in proximity to the doped cladding and in proximity to the undoped optical signal core, configured to confine pump light injected thereinto within the secondary waveguide structure; and
   one or more injection ports configured for placement of a corresponding one or more pump light sources to inject pump light into to the secondary waveguide structure.

2. The optical amplifier structure of claim 1, wherein the undoped optical signal core is a waveguide at least partially embedded in the doped cladding.

3. The optical amplifier structure of claim 1, wherein the undoped optical signal core is a waveguide outside of, but in proximity to the doped cladding.

4. The optical amplifier structure of claim 3, wherein the undoped optical signal core is separated from the doped cladding by a non-doped one of the claddings.

5. The optical amplifier structure of claim 1, wherein the undoped optical signal core is a waveguide at least partially embedded in the doped cladding and at least a portion of the secondary waveguide structure is formed around a portion of the undoped optical signal core.

6. The optical amplifier structure of claim 5, wherein claddings include an inner reflective surfaced configured to reflect within the doped cladding light injected thereinto by the pump light sources.

7. The optical amplifier structure of claim 1, wherein the undoped optical signal core is a first waveguide structure distinct from, but in proximity to, the secondary waveguide structure.

8. The optical amplifier structure of claim 7, wherein the secondary waveguide structure is at least partially embedded in the doped cladding.

9. The optical amplifier structure of claim 7, wherein the secondary waveguide structure is outside of, but in proximity to the doped cladding.

10. The optical amplifier structure of claim 9, wherein the secondary waveguide structure is separated from the doped cladding by a non-doped one of the claddings.

11. The optical amplifier structure of claim 7, wherein one or more of the injection ports includes a wedge-shaped structure on a surface of the optical amplifier structure, the wedge-shaped structure vertically tapering from a thicker end configured for coupling of a corresponding one of the pump light source and configured to focus light from the corresponding one of the pump light sources into the secondary waveguide structure.

12. The optical amplifier structure of claim 7, wherein one or more of the injection ports includes a laterally tapering array of waveguides on a surface of the optical amplifier structure, the laterally tapering array of waveguides tapering from a thicker end configured for coupling of a corresponding one of the pump light sources and configured to focus light from the corresponding one of the pump light sources into the secondary waveguide structure.

13. The optical amplifier structure of claim 12, wherein the laterally tapering array of waveguides additionally tapers vertically from the thicker end.

14. The optical amplifier structure of claim 1, wherein as formed on the substrate the undoped optical signal core has a spiral-type of geometry that loops back on itself such that adjacent portions of an optical path from the optical signal input port to the optical signal output port run in opposite directions.

15. The optical amplifier structure of claim 14, wherein the undoped optical signal core is a first waveguide structure distinct from the secondary waveguide structure, the secondary waveguide structure having a spiral-type of geometry at least a portion of which is adjacent to the first waveguide structure and configured such that an optical path from the one or more injection ports run in an opposite direction from the optical path in the adjacent portion of the first waveguide structure.

16. The optical amplifier structure of claim 1, where one or more of the injection ports are along an edge of the optical amplifier structure.

17. The optical amplifier structure of claim 1, wherein a surface of the optical amplifier structure includes one or more recessed regions including a corresponding one or more of the injections ports and configured for mounting of a pump light source therein.

18. The optical amplifier structure of claim 1, wherein the undoped optical signal core is a waveguide with a U-shaped cross-section.

19. The optical amplifier structure of claim 1, wherein the undoped optical signal core is a waveguide with a Pi-shaped cross-section.

20. The optical amplifier structure of claim 1, wherein the one or more of the dopant elements or materials includes one or more rare-earth elements or metals.

21. An optical amplifier system, comprising:
one or more pump light sources; and
an optical amplifier chip, comprising:
  a substrate;
  an undoped optical signal core formed on the substrate providing an optical path from an optical signal input port to an optical signal output port;
  one or more claddings formed on the substrate, at least one of the claddings doped with one or more dopant elements or materials that emit light within a first wavelength range when illuminated with pump light of a wavelength that is shorter than that of the first wavelength range, the undoped optical signal core located in or in proximity to the doped cladding, and the claddings having indices of refraction that are lower than an index of refraction of the undoped optical signal core;
  a secondary waveguide structure formed in or in proximity to the doped cladding and in proximity to the undoped optical signal core, configured to confine pump light injected thereinto within the secondary waveguide structure; and
  one or more injection ports coupled to the one or more pump light sources to inject pump light into to the secondary waveguide structure.

22. The optical amplifier system of claim 21, wherein the one or more pump light sources includes a light emitting diode.

23. The optical amplifier system of claim 21, wherein the one or more pump light sources includes a superluminescent light emitting diode.

24. The optical amplifier system of claim 21, wherein the one or more pump light sources includes a semiconductor laser diode.

25. The optical amplifier system of claim 21, where one or more of the injection ports are along an edge of the optical amplifier chip with a corresponding one or more of the pump light source attached thereto.

26. The optical amplifier system of claim 21, wherein a surface of the optical amplifier chip includes one or more recessed regions including a corresponding one or more of the injections ports and a corresponding one of the pump light source mounted therein.

27. The optical amplifier system of claim 21, wherein the undoped optical signal core is a waveguide at least partially embedded in the doped cladding.

28. The optical amplifier system of claim 21, wherein the undoped optical signal core is a waveguide outside of, but in proximity to the doped cladding.

29. The optical amplifier system of claim 28, wherein the undoped optical signal core is separated from the doped cladding by a non-doped one of the claddings.

30. The optical amplifier system of claim 21, wherein the undoped optical signal core is a waveguide at least partially embedded in the doped cladding and at least a portion of the secondary waveguide structure is formed around a portion of the undoped optical signal core.

31. The optical amplifier system of claim 30, wherein claddings include an inner reflective surfaced configured to reflect within the doped cladding light injected thereinto by the pump light sources.

32. The optical amplifier system of claim 21, wherein the undoped optical signal core is a first waveguide structure distinct from, but in proximity to, the secondary waveguide structure.

33. The optical amplifier system of claim 32, wherein the secondary waveguide structure is at least partially embedded in the doped cladding.

34. The optical amplifier system of claim 32, wherein the secondary waveguide structure is outside of, but in proximity to the doped cladding.

35. The optical amplifier system of claim 34, wherein the secondary waveguide structure is separated from the doped cladding by a non-doped one of the claddings.

36. The optical amplifier system of claim 32, wherein one or more of the injection ports includes a wedge-shaped structure on a surface of the optical amplifier chip, the wedge-shaped structure vertically tapering from a thicker end configured for coupling of a corresponding one of the pump light source and configured to focus light from the corresponding one of the pump light sources into the secondary waveguide structure.

37. The optical amplifier system of claim 32, wherein one or more of the injection ports includes a laterally tapering array of waveguides on a surface of the optical amplifier chip, the laterally tapering array of waveguides tapering from a thicker end configured for coupling of a corresponding one of the pump light sources and configured to focus light from the corresponding one of the pump light sources into the secondary waveguide structure.

38. The optical amplifier system of claim 37, wherein the laterally tapering array of waveguides additionally tapers vertically from the thicker end.

39. The optical amplifier system of claim 21, wherein as formed on the substrate the undoped optical signal core has a spiral-type of geometry that loops back on itself such that adjacent portions of an optical path from the optical signal input port to the optical signal output port run in opposite directions.

40. The optical amplifier system of claim 39, wherein the undoped optical signal core is a first waveguide structure distinct from the secondary waveguide structure, the secondary waveguide structure having a spiral-type of geometry at least a portion of which is adjacent to the first waveguide structure and configured such that an optical path from the one or more injection ports run in an opposite direction from the optical path in the adjacent portion of the first waveguide structure.

41. The optical amplifier system of claim 21, wherein the undoped optical signal core is a waveguide with a U-shaped cross-section.

42. The optical amplifier system of claim 21, wherein the undoped optical signal core is a waveguide with a Pi-shaped cross-section.

43. The optical amplifier system of claim 21, wherein the one or more of the dopant elements or materials includes one or more rare-earth elements or metals.

* * * * *